United States Patent Office 3,005,624
Patented Oct. 24, 1961

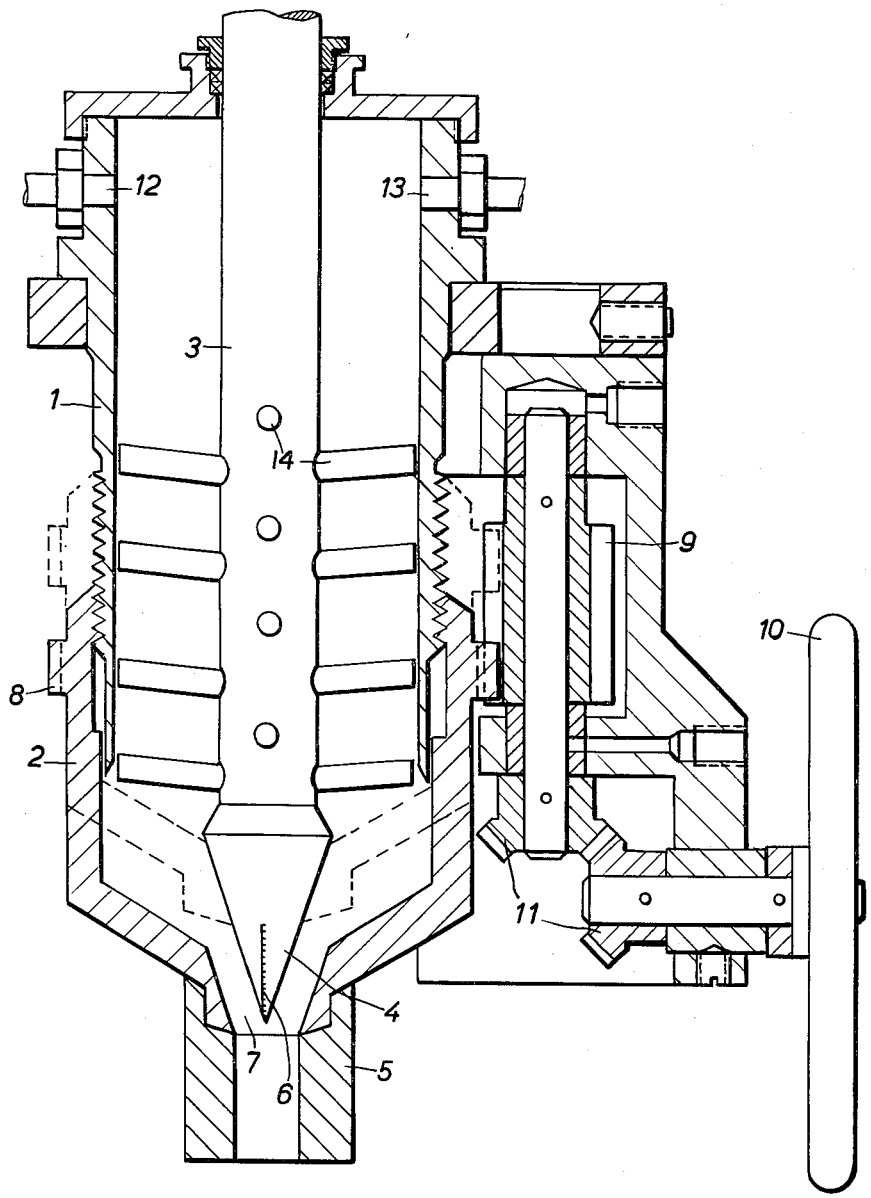

3,005,624
MIXING APPARATUS
Peter Hoppe, Troisdorf, Karl Breer, Koln-Flittard, and Erwin Weinbrenner, Leverkusen, Germany, assignors, by mesne assignments, to Mobay Chemical Company, Pittsburgh, Pa., a corporation of Delaware
Filed Aug. 1, 1957, Ser. No. 675,605
Claims priority, application Germany May 11, 1956
2 Claims. (Cl. 259—8)

This invention relates generally to an apparatus for mixing liquids and, more particularly, to an improved apparatus for making polyurethane plastics. The present application is a continuation in part of our copending application Serial No. 657,618, now abandoned.

It has been disclosed that cellular plastics may be formed by mixing together a polyisocyanate and an organic compound having reactive hydrogen atoms. These compounds react chemically with each other to form a polyurethane compound. It is preferred to react a polyhydroxy compound with the polyisocyanate. Water is usually added in order to produce carbon dioxide which forms the pores in the resulting polyurethane product. Activators or catalysts are included in the formulation in order to control the reaction rate and the characteristics of the finished product.

It is necessary that the various components going into the polyurethane plastic be mixed together rapidly and poured into a suitable molding device before completion of the chemical reaction. An apparatus that is admirably suited for this purpose is disclosed in U.S. Patent 2,764,565, granted to P. Hoppe et al., September 25, 1956. This apparatus provides a means for intimately mixing the catalyst and other components of the polyurethane plastic together and permits accurate variation of the proportion of the components in the mixture as required to obtain the desired degree of rigidity or flexibility in the finished foam. It has been found, however, that relatively large slabs of the polyurethane plastic foam made with this apparatus may have a tendency to crack and the product may not always have a cellular structure that is relatively uniform in cell size. It has been proposed to include a paraffin oil or silicone oil in the formulation to avoid cracking of the hardened slab, but such additives remain in the finished foam thereby resulting in a product which may have undesirable chemical composition and undesirable mechanical properties. Moreover, such additives may foul the mixing equipment and troublesome and time-consuming cleaning operations may be required at frequent intervals.

It is therefore an object of this invention to provide an improved apparatus for mixing liquids together. A more specific object of the invention is to provide an improved apparatus for mixing the components of a polyurethane plastic together. Another object of the invention is to provide an apparatus for making polyurethane foam plastics having improved uniformity of pore size and improved physical characteristics. Still another object of the invention is to provide an apparatus and process for making polyurethane foam plastics of substantially uniform pore size and substantially free from voids. A still further object of the invention is to provide a method and apparatus for making large slabs of polyurethane foam plastic of substantially uniform pore or cell size having such physical characteristics that there is little or no tendency for the hardened foam product to crack. Another object of the invention is to provide a method and apparatus for making polyurethane foam plastics, without the addition of undesirable oils, that have improved chemical and mechanical properties, resist cracking and have a substantially uniform cell structure.

Other objects will become apparent from the following description with reference to the accompanying drawing which illustrates an embodiment of the invention in a longitudinal sectional view.

The foregoing objects are accomplished in accordance with this invention by providing an apparatus having a mixing chamber in which the liquid components of a polyurethane foam plastic may be intimately mixed together, a discharge means and means for adjusting the size of the opening in said discharge means. The discharge means is preferably provided with a conduit or pouring spout through which the mixed components are poured into a suitable means for shaping the polyurethane reaction mixture as chemical reaction proceeds and the mixture changes from a liquid into a solid or non-fluid porous product. This mixing chamber is provided with a stirrer or agitator having a shaft and blades mounted thereon. The agitator shaft has one end which is of suitable size and shape to partially or completely close the discharge opening as the agitator or discharge means is moved with respect to the other. Preferably, the mixing chamber is provided with one end or bottom which can be moved with respect to the agitator to determine the depth of penetration of the opening by the shaft and thus determine the size of the discharge opening. The end of the agitator shaft is preferably substantially conical or frusto-conically shaped and the discharge opening meshing therewith is of the same general shape. The shaped end of the agitator shaft may be provided with a scale which indicates the size of the opening at a given depth of penetration by the shaft.

In accordance with this invention, the mixture of components which react to form the polyurethane foam plastic may be prepared in the usual way, such as by the process disclosed in U.S. Patent 2,764,565, issued to Hoppe et al., or by any other suitable process. When using an apparatus of the type disclosed in the patent, the organic compound having the reactive hydrogen atoms, which is conveniently an hydroxyl polyester, an hydroxyl polythioether, an hydroxyl polyether or any other suitable compound, may be pumped or otherwise moved from a suitable storage vessel into the mixing zone or chamber where it is mixed with a polyisocyanate. A suitable catalyst or activator may be introduced simultaneously into the mixing zone under a pressure greater than the pressure in the mixing zone. In order to assure substantially complete mixing of the activator with the viscous polyester or similar compound, the activator may be injected into the mixing zone containing the polyester either continuously or intermittently. If intermittent injection is utilized, the frequency of the injection rate should be from about 50 to about 10,000 injections per minute with an injection rate of about 2,000 to about 10,000 injections per minute being preferred.

It has been found that it is possible to predetermine the cell or pore size of the finished polyurethane foam plastic by restricting the flow of reaction mixture through the discharge opening of the mixing apparatus. The invention is thus based on the discovery that the pore structure of the resulting polyurethane product depends upon the dynamic pressure of the mixture of components in the mixing chamber. It has been found that this pressure can be very accurately adapted to the proportions used for the components if the outlet end of the mixing chamber is constructed, according to the invention, as a nozzle cap movable longitudinally in relation to the stirrer, the end of the stirrer shaft forming the nozzle needle. The outlet bore of the nozzle cap is preferably of conical or frusto-conical shape as is the end of the stirrer shaft. The cap is preferably adapted to be screwed on the outside of the mixing chamber. The adjustment of the outlet aperture is preferably effected by a drive means for the nozzle cap, the said drive means being moved manually or, if preferred, by suitable mechanical means.

It has been found that the size of the pore of the polyurethane foam plastic becomes larger and the number thereof smaller as the size of the discharge opening is decreased and the dynamic pressure in the chamber thereby increased.

Any suitable polyisocyanate, including those disclosed in U.S. Patent 2,764,565, may be utilized in preparing the foamable mixture. Specific examples include 2,4-toluylene diisocyanate, 2,6-toluylene diisocyanate, 1,4-phenylene diisocyanate, triphenylmethane-4,4′,4″-triisocyanate, 1,5-naphthylene diisocyanate, diphenylmethane-4,4′-diisocyanate, and 4(4′-diphenyldimethylmethane diisocyanate and the like. Water is usually used as the cross-linking agent in order to insure proper porosity in the finished product, but any other cross-linker producing this result may be used. The chemical components react together to form a polyurethane plastic and carbon dioxide which is evolved and forms the pores in the resulting solid polyurethane plastic.

Any suitable catalyst may be utilized, including heavy metal compounds and tertiary amines, such as, for example, dimethylhexahydroaniline, diethylhexahydroaniline, reaction products of N,N′-diethylaminoethanol and phenylisocyanate, ester amines, sodium phenylates and the like. In many cases, it is preferred to employ what is commonly referred to as an activator mixture, i.e., a mixture comprising a catalyst, a surface active agent and a small amount of water.

The organic compound having the reactive hydrogen atom may be any suitable compound of this type including, for example, a polyester, either linear or branched, a polyesteramide, a polyalkylene ether glycol, a polyalkylene thioether glycol or the like, or, in some instances, it may be a mixture of one or more of these materials. The polyesters may be prepared by reaction between any suitable polycarboxylic acids and preferably a dicarboxylic acid. Adipic, sebacic, 6-aminocaproic, phthalic, isophthalic, terephthalic, maleic, cyclyhexane-1,2-dicarboxylic, and the like, including those disclosed in the aforesaid patent, may be utilized for reacting with a suitable glycol or other polyhydric alcohol to form the polyester. Any suitable polyhydric alcohol, including those disclosed in the aforesaid patent, such as ethylene glycol, diethylene glycol and the various amino alcohols, such as, for example, ethanolamine, the aminopropanols and the like, may be used. The polyalkylene ether glycols are also obtainable in known manner, such as by polymerization of alkylene oxides, including ethylene oxide, propylene oxide and tetrahydrofuran. The polyisocyanate and organic compound having reactive hydrogens may be mixed together and heated to form a prepolymer having unreacted NCO groups and this prepolymer may then be mixed with the water and activator mixture, if desired. An excess of polyisocyanate over that required to react with all the active hydrogens is used in preparing the prepolymer.

Referring now to the drawing for a description of one embodiment of the invention, a mixing apparatus of the general type disclosed in the aforesaid patent to Hoppe et al. is shown in a longitudinal sectional view. Mixing chamber 1 is provided with a nozzle cap or substantially closed bottom 2 having substantially frusto-conically shaped discharge opening 7. Stirrer 3 has a substantially conically shaped end 4 which meshes with opening 7. Nozzle 2 is provided with annular rim 8 which meshes with toothed wheel 9. Toothed wheel 9 is geared to hand wheel 10. When hand wheel 10 is turned, toothed wheel 9 is turned by means of the bevel gear 11. As wheel 9 turns, nozzle 2 is moved upwardly or downwardly with respect to agitator shaft 3 and opening 7 is thereby varied in cross-sectional dimensions depending upon the depth of penetration of conically shaped end 4 into opening 7. As illustrated by the dotted lines in the drawing, nozzle 2 may be moved to a position where opening 7 is substantially completely closed. As opening 7 becomes closed, the dynamic pressure becomes greater in the chamber and the pore size of the resulting product may be predetermined by predetermining the size of opening 7 and the dynamic pressure in chamber 1.

The liquid components are pumped or otherwise introduced into mixing chamber 1 through conduits 12 and 13. A conduit or pouring spout 5 is preferably included as this conduit facilities pouring of the reaction mixture without splashing and provides a means for avoiding voids or exceptionally large pores caused by splashing. The end of the shaft 3 may be provided with a graduated scale 6 to indicate the depth of penetration into opening 7 thereby facilitating the predetermination of the dynamic pressure in the chamber and pore size of the product. Shaft 3 is provided with radial pins 14.

In making a polyurethane plastic using the apparatus illustrated in the drawing, the reaction mixture may be prepared from about 100 parts of a polyester having an hydroxyl number of about 60 and an acid number of below 1 with about 49 parts 2,4-toluylene diisocyanate and about 11 parts of a suitable activator mixture. The isocyanate and the activator mixture are preferably separately injected into a stream of the polyester in mixing chamber 1. The polyester may have been prepared from about 15 mols adipic acid, about 16 mols diethylene glycol and about 1 mol trimethylol propane. The activator mixture may have been prepared from about 3 parts bis-diethylamino ethanol adipate, about 1 mol diethylamine oleate, about 1.5 parts of a sodium salt of a sulfonated castor oil and about 54 parts by weight water, about 1.5 parts sulfonated ricinoleic acid in about 54% water, about 0.3 part glycerine and about 2 parts water. After complete mixing of the components, the mixture is discharged through opening 7 and the pore size of the product will depend upon the size of opening 7. It is, of course, to be understood that any other suitable polyurethane plastic reaction mass may be mixed in chamber 1 and discharged through opening 7. Likewise, any other suitable mixing chamber may be combined with the discharge means provided by this invention to provide an apparatus which permits predetermination and control of the cell size and cell distribution in the finished polyurethane plastic.

The herein described mixing chamber allows to vary the size of pores of the plastic foam while the composition of the foamable reaction mixture remains unchanged. By reducing the size of the outlet opening an increase in pressure occurs which leads to the formation of a foamed product having larger pores than the foam produced by means of a larger outlet opening at a lower pressure in the mixing chamber. The table below shows the variation of the size of pores of a foamed product produced from the following starting materials, depending on the size of the outlet opening:

100 parts of a polyester consisting of 15 mols of adipic acid, 16 mols of diethylene glycol, 1 mol of trimethylol propane, having a hydroxyl number of 60 and an acid number below 1, 49 parts of toluylene diisocyanate,
11 parts of a mixture consisting of
3 parts of bis-(diethylaminoethanol)-adipate
1 part of diethylamineoleate
1.5 parts of the sodium salt of a sulfonated castor oil containing 54% water,
1.5 parts of a sulfonated ricinoleic acid containing 54% water,
0.3 part of glycerine,
2 parts of water.

*Influence of the outlet opening, i.e. of the dynamic pressure in the mixing chamber, on the size of pores of the foamed product*

| Inside diameter, cm.² | size of pores, mm. | dynamic pressure, atü. |
|---|---|---|
| 3.00 | 0.1 | 2.0 |
| 2.50 | 0.15 | 2.5 |
| 2.00 | 0.25 | 3.2 |
| 1.50 | 1.50 | 4.5 |
| 1.00 | 4.00 | 7.0 |

Although the invention has been described in considerable detail in the foregoing for the purpose of illustration, it is to be understood that such detail is solely for this purpose and that variations can be made by those skilled in the art without departing from the spirit and scope of the invention except as is set forth in the claims.

What is claimed is:

1. An apparatus for mixing liquids comprising a mixing chamber, said chamber including a first portion and a second portion, said second portion being longitudinally movable with relation to said first portion, said first portion having a plurality of inlet means for introducing liquids to be mixed, said second portion having an axially aligned frusto-conically shaped discharge outlet, said agitating means extending axially within said mixing chamber toward said discharge outlet, said agitating means including an end portion having a configuration complementary to that of said discharge outlet, said end portion of said agitating means being provided with a graduated scale to indicate the size of the discharge outlet and means adapted for moving said second portion with respect to said first portion and said end portion of said agitating means to alter the size of said discharge outlet while said liquids are passing through said mixing chamber.

2. An apparatus for mixing liquids comprising a mixing chamber, said chamber including a first portion and a second portion, said second portion fitting about said first portion, being threadedly engaged therewith and being free to move longitudinally with relation to said first portion at all times by rotation of said second portion with respect to said first portion, said first portion having a plurality of inlet means for introducing liquids to be mixed, said second portion having an axially aligned frusto-conically shaped discharge outlet, an agitating means extending axially within said mixing chamber toward said discharge outlet, said agitating means including an end portion having a configuration complementary to that of said discharge outlet, and, in combination with said mixing chamber, a driving means for rotating said second portion to cause the longitudinal movement thereof with respect to said first portion and said end portion of said agitating means to alter the size of said discharge outlet while said liquids are passing through said mixing chamber, including an annular toothed rim provided on the outer wall of said second portion, said rim engaging a toothed wheel, said toothed wheel being geared to a hand wheel.

References Cited in the file of this patent

UNITED STATES PATENTS

| | | |
|---|---|---|
| 300,170 | Van Riper et al. | June 10, 1884 |
| 515,571 | Burgess | Feb. 27, 1894 |
| 1,101,199 | Legg et al. | June 23, 1914 |
| 1,170,246 | Green | Feb. 1, 1916 |
| 2,033,412 | Chapman | Mar. 10, 1936 |
| 2,061,852 | Schweitzer | Nov. 24, 1936 |
| 2,122,287 | Kepper | June 28, 1938 |
| 2,418,036 | Lane | Mar. 25, 1947 |
| 2,457,733 | Rodman et al. | Dec. 28, 1948 |
| 2,464,588 | Knudsen et al. | Mar. 15, 1949 |
| 2,592,709 | Kinnaird | Apr. 15, 1952 |
| 2,816,741 | Shuffman | Dec. 17, 1957 |

UNITED STATES PATENT OFFICE
CERTIFICATION OF CORRECTION

Patent No. 3,005,624                          October 24, 1961

Peter Hoppe et al.

It is hereby certified that error appears in the above numbered patent requiring correction and that the said Letters Patent should read as corrected below.

In the grant, lines 3 and 4, for "assignors, by mesne assignments, to Mobay Chemical Company, of Pittsburgh, Pennsylvania, a corporation of Delaware," read -- assignors, by direct and mesne assignments, of one-half to Farbenfabriken Bayer Aktiengesellschaft, of Leverkusen, Germany, a corporation of Germany, and one-half to Mobay Chemical Company, of Pittsburgh, Pennsylvania, a corporation of Delaware, --; line 13, for "Mobay Chemical Company, its successors" read -- Farbenfabriken Bayer Aktiengesellschaft and Mobay Chemical Company, their successors --; in the heading to the printed specification, lines 4 to 6, for "assignors, by mesne assignments, to Mobay Chemical Company, Pittsburgh, Pa., a corporation of Delaware" read -- assignors, by direct and mesne assignments, of one-half to Farbenfabriken Bayer Aktiengellschaft, Leverkusen, Germany, a corporation of Germany, and one-half to Mobay Chemical Company, Pittsburgh, Pa., a corporation of Delaware --; column 3, line 20, for "4(4'-" read -- 4,4'- --.

Signed and sealed this 17th day of April 1962.

(SEAL)
Attest:

ESTON G. JOHNSON                        DAVID L. LADD
Attesting Officer                        Commissioner of Patents